(12) United States Patent
Ginzton (10) Patent No.: US 8,195,866 B2
(45) Date of Patent: Jun. 5, 2012

(54) ADJUSTING AVAILABLE PERSISTENT STORAGE DURING EXECUTION IN A VIRTUAL COMPUTER SYSTEM

(75) Inventor: Matt Ginzton, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1073 days.

(21) Appl. No.: 12/111,155

(22) Filed: Apr. 28, 2008

(65) Prior Publication Data

US 2008/0270674 A1    Oct. 30, 2008

Related U.S. Application Data

(60) Provisional application No. 60/926,347, filed on Apr. 26, 2007.

(51) Int. Cl.
*G06F 12/00* (2006.01)

(52) U.S. Cl. .............................. 711/6; 711/154; 709/230

(58) Field of Classification Search .............. 711/6, 154; 709/230
See application file for complete search history.

(56) References Cited

U.S. PATENT DOCUMENTS

7,433,951 B1 * 10/2008 Waldspurger ................. 709/226
2005/0144402 A1 * 6/2005 Beverly ........................ 711/152
* cited by examiner

*Primary Examiner* — Matthew Bradley

(57) ABSTRACT

The amount of virtual disk space that is available for use by software executing within a virtual machine may be dynamically adjusted while the virtual machine is running in a virtual computer system. According to one aspect, a method for flexible run-time reservation of disk space from a virtual machine is provided. The method includes designating for use by a first virtual machine, a fixed portion of disk space accessible by a computing system. The first virtual machine is activated. During operation of the first virtual machine, a portion of the fixed portion of the disk space designated for use by the first virtual machine is reserved from within the first virtual machine. Use of the reserved portion is controlled from outside of the first virtual machine.

35 Claims, 4 Drawing Sheets

ADJUSTING AVAILABLE PERSISTENT STORAGE DURING EXECUTION IN A VIRTUAL COMPUTER SYSTEM

This application claims the benefit of U.S. Provisional Application No. 60/926,347, filed Apr. 26, 2007, which provisional application is incorporated herein by reference in its entirety.

FIELD OF THE INVENTION

One or more embodiments of the present invention relate to allocating resources in a virtual computer system, and, in particular, to adjusting the amount of persistent storage that is available within a virtual machine in a virtual computer system.

BACKGROUND

A computing system, such as a general purpose computing platform, has various resources that are made available to software that executes on the computing system. Examples of the computing system resources include processor time, I/O bandwidth, memory space, and disk space. As used herein, the term "host system" refers to a computing system including various resources that may be shared by software that executes on the host system.

One type of software that may execute on a host system is virtualization software. A host system running virtualization software may be referred to as a virtual computer system. As described in existing literature, including prior patents and patent applications from VMware, Inc., the assignee of this patent application, virtual computer systems come in many different varieties, including some that are "hosted" and others that are "unhosted." In the case of a hosted virtual computer system, a distinct host operating system may provide certain functionality, such as for interfacing with input/output (I/O) devices, for use by the core virtualization software and/or by other software executing in the computer system. In an unhosted virtual computer system, the core virtualization software itself may include some or all of the functionality provided by the host operating system in a hosted system. Virtual computer systems may involve full virtualization of a hardware architecture, or they may involve only partial virtualization, including so-called paravirtualized systems. Virtual computer systems may also support a virtual machine that has the same general hardware architecture as the underlying physical system, or they may support virtual machines that have a virtual hardware architecture that is substantially different from the underlying physical hardware architecture. Many other possibilities also exist or may be subsequently developed. This invention may be implemented in a wide variety of such virtual computer systems.

Virtualization software virtualizes the underlying resources of the host system such that an operating system and applications that run in a virtual machine only see virtual system resources that the virtualization software makes available in the virtual machine. The operating system running in a virtual machine is referred to herein as a "guest operating system," while applications running in a virtual machine are generally referred to as "guest applications." More generally, software running in a virtual machine, not including software that supports, or forms part of, the virtualization software, is generally referred to as "guest software." The virtual system resources made available to the guest software may be a portion of the host system resources that are allocated to the virtual machine, such as a portion of the host memory, for example; or they may be emulated virtual system resources that do not directly correspond with host system resources, such as a physical USB (Universal Serial Bus) port, with a connected USB flash memory device, being emulated as an attached SCSI (Small Computer System Interface) hard drive, for example. The virtual machine is an abstraction supported by the virtualization software. The virtual machine appears to the guest operating system and guest applications as a physical host system.

Multiple virtual machines may execute on the same host system. One or more thin layers of software may operate between each virtual machine and the underlying host system hardware. In some implementations, this software is referred to as a virtual machine monitor (VMM) or a hypervisor. In this patent application, the software that supports such virtual machines will be referred to as "virtualization software." The term "virtualization software" is used in a broad sense herein to generally refer to any and all software that supports the operation of one or more virtual machines, including, for example, a host operating system in a hosted virtual computer system, and also including software that runs within the virtual machine, which nonetheless supports the operation of the virtual machine. Virtualization software does not, however, include ordinary software that is commonly executed in physical computer systems that do not involve the use of virtual machines, such as ordinary operating systems, ordinary applications, ordinary drivers, etc., that can execute in ordinary, non-virtualized computer systems.

As will be described in greater detail below, one function of the virtualization software is to control host system resource allocation among virtual machines. As mentioned above, one host system resource that may be allocated is persistent storage, such as hard disk storage. A host system may have access to one or more physical disk drives or other persistent storage devices, locally attached to the host system or accessible to the host system via a network or some other interface. The description below focuses on physical disk storage, although it also applies to other types of persistent storage. On a host system with no virtualization, a host operating system can be used to divide a disk into logical portions referred to as partitions or volumes, depending on the operating system being used. Once the physical disk is partitioned into logical partitions or volumes, a file system may be created on one or more of the partitions. The file system typically encompasses a portion of physical disk space that is fixed at boot-up time. The size of the fixed portion is typically selected to accommodate the operating system and initial applications, and to allow for future growth. The file system includes data structures that define file formats and organizational structure.

In a virtual computer system supporting one or more virtual machines, each virtual machine may be given a fixed amount of the physical disk space of the host system in the form of a virtual disk or other virtual storage. One method for virtualizing disk space involves the use of one or more files within the file system of the host system, where the one or more files in the host system may be used to store the contents of a virtual disk in the virtual machine. The virtualization software emulates a virtual disk for use by guest software, but the data that is written to the virtual disk is stored in one or more files in the host file system. For example, a 10 gigabyte file may be created on the host system to support the emulation of a 10 gigabyte virtual disk in the virtual machine. The physical disk space used to store the data written to a virtual disk need not be contiguous. Instead, the virtualization software provides a mapping functionality between locations on the virtual disk, as they appear to the guest software, and corresponding locations in the physical disk space.

Each virtual machine in a virtual computer system may have its own guest operating system and its own file system(s). Like the case where no virtualization is present, the amount of disk space provided to each virtual machine at boot-up time is typically enough space to store the guest operating system and guest applications, plus some additional space to allow for future growth.

When a fixed amount of disk space is provided to a virtual machine at boot-up time and a file system is implemented within the disk space, it is difficult to later change the amount of disk space encompassed by the file system. For example, changing the amount of disk space would typically require modification of a file system's internal data structures. Since some file systems are proprietary, such modification might require reverse engineering. In addition, different operating systems and file systems may be loaded on different virtual machines, each requiring custom programming to modify the amount of disk space allocated to the respective file system.

In order to avoid having to change the disk space provided to virtual machines, sufficient disk space may be provided to each virtual machine at boot-up time to account for all anticipated future growth. For example, if a virtual machine requires 5 gigabytes of storage to accommodate its initial footprint, it may be desirable to allocate 10 gigabytes of storage to the virtual machine as an initial allocation to allow for 5 gigabytes of future growth. However, it is often difficult to predict the growth needs of an individual virtual machine. If the initial allocation is more than will be needed, the number of virtual machines that execute on the host computer system may be unnecessarily limited, and/or the amount of physical disk space required for the host computer system may be unnecessarily large. If the initial allocation is too small, the virtual machine may not be able to support a sufficient number of guest applications or other software.

Another option is to initially refrain from allocating all of the physical disk space required to store the contents of an entire virtual disk. In the example above, instead of creating a 10 gigabyte file in the host system for the emulation of a 10 gigabyte virtual disk, the file in the host system may be smaller than 10 gigabytes. For portions (or blocks) of a virtual disk that have not yet been written to, the virtualization software may defer allocating corresponding physical disk space until those portions are written to by guest software. As more of the virtual disk is written to, the size of the file increases to contain the increased data content of the virtual disk. Virtual storage for which all of the corresponding physical storage space is not initially allocated, so that there is no corresponding physical storage reserved for virtual storage that has not yet been written to, is referred to herein as "sparse" virtual storage.

With the use of sparse virtual storage, the storage resources of a host computer system may be overcommitted. In other words, the sum of all of the virtual storage space that is provided to virtual machines in a virtual computer system may exceed the physical storage space of the host computer system. For example, suppose that a virtual machine is presented with a 10 gigabyte virtual disk. If the guest software in the virtual machine is only presently using 2 gigabytes of this virtual disk, then the contents of the virtual disk may be contained in a file that only occupies about 2 gigabytes of disk space. The remaining 8 gigabytes of physical storage that has not yet been allocated to the virtual machine may be used for other purposes instead, such as to store the data of other virtual disks used by other virtual machines, including other sparse virtual disks.

Suppose now that each of 10 virtual machines is presented with its own 10-gigabyte virtual disk. Suppose further that the guest software in each virtual machine initially uses only 2 gigabytes of its respective virtual disk. Suppose further that the host system has only a 50-gigabyte disk drive. In this case, the host disk is overcommitted by 50 gigabytes. As the disk utilization of the virtual machines increases, the available physical storage space will gradually be utilized. At some point, the guest software in one of the virtual machines may issue a write operation that causes the physical disk capacity of the host system to be exceeded. When this occurs, the disk hardware reports a write error. If this write error propagates to the guest operating system, the guest operating system may interpret it as a write error due to a disk failure, because the guest operating system will still see available disk space on its own virtual disk. The guest operating system may reattempt the write operation, but the reattempt will also fail because the host disk is full. In this situation, the virtual machine may shut down or fail.

The various embodiments described herein may employ various computer-implemented operations involving data stored in computer systems. For example, these operations may require physical manipulation of physical quantities usually, though not necessarily, these quantities may take the form of electrical or magnetic signals or states where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable code can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regarding the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

SUMMARY OF THE INVENTION

The subject matter described herein includes methods, systems, and computer program products for flexible run-time reservation of disk space from a virtual machine in a computing system. According to one aspect, a method for flexible run-time reservation of disk space from a virtual machine in a computing system is provided. The method includes designating for use by a first virtual machine, a fixed portion of disk space accessible by a computing system. The first virtual machine is activated. During operation of the first virtual machine, a portion of the fixed portion of the disk space designated for use by the first virtual machine is reserved from within the first virtual machine. Use of the reserved portion is controlled from outside of the first virtual machine.

According to another aspect, the subject matter described herein includes a system for flexible run-time reservation of disk space from a virtual machine in a computing system. The system includes a regulation file manager for, during operation of a first virtual machine, reserving, from within the first virtual machine, a portion of the disk space designated for use by the first virtual machine. The system further includes a storage resource manager for controlling use of the reserved portion of disk space outside of the first virtual machine.

The subject matter described herein for flexible run-time reservation of disk space from a virtual machine in a computing system may be implemented using a computer program product comprising computer executable instructions embodied in a computer readable medium.

DETAILED DESCRIPTION

Figure 1:
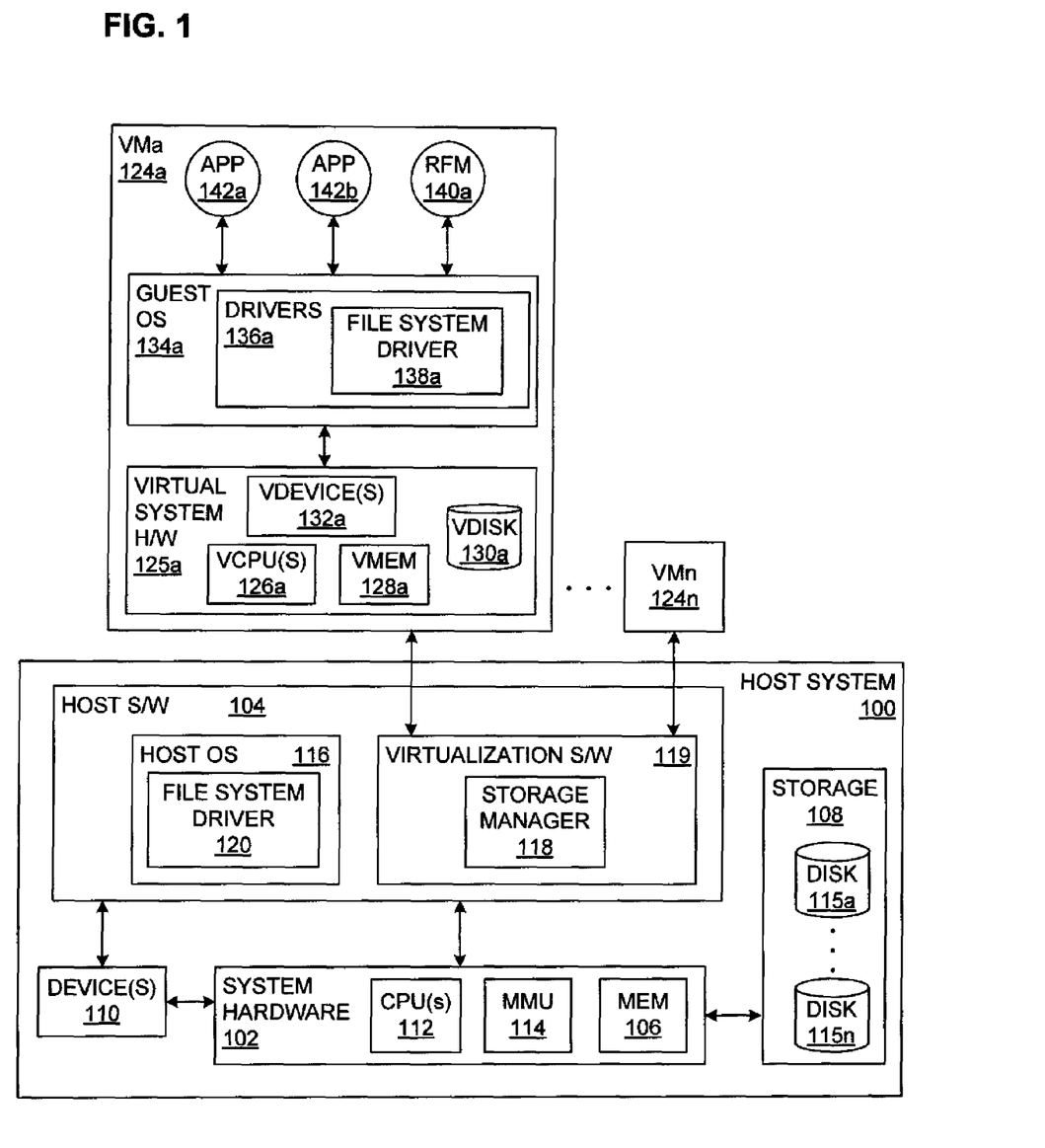
FIG. 1 is a block diagram of a virtual computer system in which an embodiment of this invention is implemented.

Embodiments of this invention include methods, systems, and computer program products for adjusting the amount of persistent storage that is available for use within a virtual machine in a virtual computer system. FIG. 1 is a block diagram illustrating an exemplary virtual computer system in which an embodiment of this invention is implemented. In FIG. 1, host system 100 includes physical hardware 102, host software 104, memory 106, disk storage (or other persistent storage) 108, and one or more peripheral devices 110. Hardware 102 may include one or more central processing units (CPUs) 112 that execute instructions for controlling the operation of the computing system. A memory management unit 114, along with system-level host software, may control allocation of memory 106 to devices and software of host system 100. The memory management unit 114 may be implemented within the processor 112. Additional hardware devices, such as network cards and 110 interfaces are generically represented as devices 110. The operation of these devices is not essential to explaining the subject matter described herein and hence will not be described.

In this patent application, the following terminology will be used to distinguish between different types of physical and virtual disk space: physical disk space that is accessible from within the host system is referred to as "physical disk space;" physical disk space that has not yet been allocated is referred to as "available physical disk space;" physical disk space that has been allocated is referred to as "utilized physical disk space;" virtual disk space that is presented to the guest software in a virtual machine, often in the form of one or more virtual disks, is referred to as "designated virtual disk space;" virtual disk space that has been allocated within a virtual machine, not including virtual disk space occupied by disk space regulation files, which are described below, is referred to as "utilized virtual disk space;" virtual disk space that has not yet been allocated within a virtual machine, either for a disk space regulation file or otherwise, is referred to as "available virtual disk space;" designated virtual disk space minus virtual disk space occupied by disk regulation files is referred to as "effective virtual disk space;" and virtual disk space for which corresponding physical disk space contains data that has been written to the virtual disk space is referred to as "backed virtual disk space."

Disk storage 108 of host system 100 may include one or more physical disks 115a-115n. Physical disks 115a-115n may be located in host system 100, or they may be accessible to the host system via a network or other interface, and made available to host system 100. For example, physical disks 115a-115n may be part of a storage area network (SAN) or network attached storage (NAS) accessible by host system 100. One aspect of some embodiments of this invention is an ability to increase or decrease the amount of virtual disk space that is available for use from within a virtual machine, after the initial virtual disk space for the virtual machine has been designated, and after the guest software has begun using the designated virtual disk space, including setting up a file system thereon.

In the illustrated example, host software 104 includes a host operating system 116 and virtualization software 119. In other embodiments, as described briefly above, there may not be a separate host operating system, and some or all of the functionality provided by the host operating system 116 may be performed instead by the virtualization software 119. Virtualization software 119 may comprise one or more virtual machine monitors or hypervisors. As illustrated in FIG. 1, virtualization software 119 includes a storage resource manager 118. Host operating system 116 includes a host file system driver 120. File system driver 120 defines the file system data structures used to store data on physical disks allocated to host operating system 116. Everything in the host system 100 may be substantially the same as in existing virtual computer systems, except as described below. For example, except as described below, the host system 100 may be implemented by an installation of the Workstation virtualization product from VMware, Inc. on a compatible desktop computer.

The virtualization software 119 acts as an interface to host system 100 for virtual machines 124a-124n. In some implementations, the virtualization software 119 runs directly on top of host system hardware and thus functions as a host operating system for the virtual machines. In other implementations, host operating system 116 may be interposed as a software layer between the virtualization software and the physical hardware. Either type of configuration is intended to be within the scope of this invention, along with other possible configurations. Additional configurations that are also intended to be within the scope of this invention include configurations in which there is a separate virtual machine monitor for each virtual machine in the virtual computer system. In some such configurations, each virtual machine monitor may be configured as part of its respective virtual machine. Also, for some configurations, multiple virtual machine monitors may be different instances of the same computer software, or they may comprise multiple, distinct software modules. Alternatively, a single virtual machine monitor may act as an interface to host system 100 for multiple virtual machines.

Storage resource manager 118 may be a component that resides outside of (i.e. executes outside of the context of) virtual machines 124a-124n. As described below, storage resource manager 118 may control the amount of virtual disk space available to guest software executing in each virtual machine at run-time. Storage resource manager 118 may communicate with software modules within each virtual machine to determine the disk resource needs of each virtual machine and dynamically adjust the amount of available virtual disk space within each virtual machine. The functionality of the storage resource manager 118 will be described in greater detail below, in connection with FIG. 2.

Each virtual machine 124a-124n includes virtual hardware resources 125, such as one or more virtual processor(s) 126, virtual memory 128, designated virtual disk space 130, and virtual devices 132. Thus, for example, virtual machine 124a includes virtual hardware resources 125a, such as one or more virtual processor(s) 126a, virtual memory 128a, designated virtual disk space 130a, and virtual devices 132a.

Each virtual machine also includes a guest operating system 134, which may include 30 drivers 136, including a guest file system driver 138. Thus, virtual machine 124a includes a guest operating system 134a, which may include drivers 136a, including a guest file system driver 138a. Drivers 136 control and communicate with virtual devices 130 and 132. One or more software applications 142 may execute within each virtual machine 124a-124n. For example, FIG. 1 shows applications 142a and 142b executing in virtual machine 124a. Each virtual machine 124a-124n may also have a user-level regulation file manager application (RPM) 140. Thus, for example, FIG. 1 shows a user-level regulation file manager 140a executing within virtual machine 124a. Except as described below, everything within the virtual machines 124a-124n may be substantially the same as the contents of virtual machines in existing virtual computer systems. For example, except as described below, the virtual machine 124a may be substantially the same as a common virtual machine within the Workstation virtualization product from VMware, Inc., installed on a compatible desktop computer, with a standard operating system, such as a version of a Microsoft Windows operating system or a version of the Linux operating system, installed in the virtual machine, along with one or more compatible software applications. The functionality of the regulation file manager 140 is described in greater detail below, in connection with FIG. 2. In other embodiments, functionality comparable to that of user-level regulation file manager 140 may be implemented in a regulation file manager driver, which can be loaded into the guest operating system 134, as one of the drivers 136.

Figure 2:
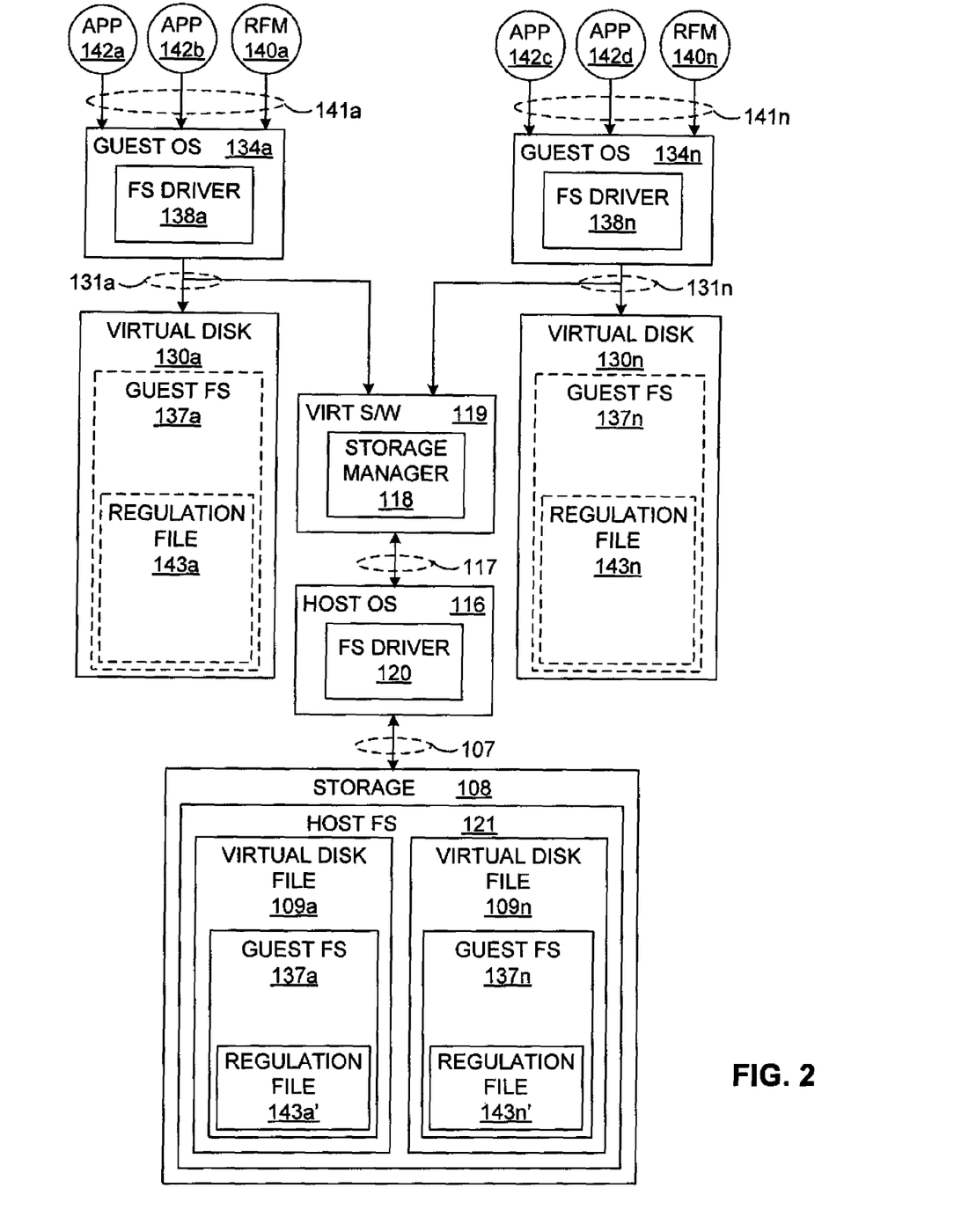
FIG. 2 is a block diagram illustrating the use of virtual and physical storage in one embodiment of this invention.

FIG. 2 is a block diagram illustrating the operation of one embodiment of this invention, as implemented in the virtual computer system illustrated in FIG. 1. Many of the components illustrated in FIG. 2 are also illustrated in FIG. 1.

FIG. 2 shows a guest operating system 134a, which executes in the virtual machine 124a illustrated in FIG. 1. User-level applications 142a and 142b, as well as user-level regulation file manager 140a, as shown in FIG. 2, also execute within the virtual machine 124a illustrated in FIG. 1. The guest operating system 134a includes guest file system driver 138a. The virtual machine 124a illustrated in FIG. 1 also includes virtual disk 130a, which is illustrated in both FIG. 1 and FIG. 2. File system driver 138a creates and maintains a guest file system 137a on the virtual disk 130a, in a conventional manner.

FIG. 2 also shows a guest operating system 134n, user-level applications 142c and 142d, and a user-level regulation file manager 140n, all of which execute within the virtual machine 124n shown in FIG. 1. The guest operating system 134n includes guest file system driver 138n. The virtual machine 124n illustrated in FIG. 1 also includes virtual disk 130n, which is illustrated in FIG. 2. File system driver 138n creates and maintains a guest file system 137n on the virtual disk 130n, in a conventional manner. Guest operating system 134n may be the same as, or different from, guest operating system 134a; file system driver 138n may be the same as, or different from, file system driver 138a; and guest file system 137n may be the same type as, or a different type from, guest file system 137a.

Guest operating system 134a and file system driver 138a may provide one or more Application Programming Interfaces (APIs) for use by applications running on the guest operating system, including applications 142a, 142b and 140a, such APIs including a file system API 141a. This file system API may provide standard functionality for creating and using files within the guest file system 137a, including functionalities such as creating a file, opening a file, reading from a file, writing to a file, and closing a file. Also of relevance to some embodiments of this invention, the API may provide functionality for setting a specified length for a file.

Similarly, guest operating system 134n and file system driver 138n may provide one or more APIs for use by applications running on the guest operating system, including applications 142c, 142d and 140n, such APIs including a file system API 14 In. Again, this file system API may provide standard functionality for creating and using files within the guest file system 137n, including functionalities such as creating a file, opening a file, reading from a file, writing to a file, closing a file, and setting a specified length for a file.

The virtual disk 130a may appear to the guest operating system 134a and the file system driver 138a to be a conventional physical disk drive, with sectors, blocks, etc., having its own amount of designated virtual disk space. Similarly, the virtual disk 130n may appear to the guest operating system 134n and the file system driver 138n to be a conventional physical disk drive, having its own amount of designated virtual disk space. The virtualization software 119 may emulate conventional interface cards that provide conventional disk interfaces 131a, 131n for use by the file system drivers 138a and 138n for accessing their respective virtual disks 130a, 130n. For example, the disk interfaces 131a, 131n may both be SCSI interfaces. Alternatively, either or both of the interfaces 131a, 131n may be another type of storage interface. Thus, the file system drivers 138a and 138n may interact with their respective virtual disks 130a, 130n, as if they are physical disk drives, through the virtual interface cards, over their respective disk interfaces 131a, 131n. Thus, for example, the file system drivers 138a and 138n may issue read commands or write commands to their respective virtual disks for specified block numbers. The file system drivers 138a and 138n will specify block numbers for blocks where they think the data they want is located, on what they think is a physical disk drive. However, the disk drives they are accessing are actually virtual disks, instead of physical disks. The block numbers specified by the file system drivers 138a and 138n typically will not correspond to block numbers on physical drives at which the desired data may be found. Instead, the block numbers issued by the file system drivers 138a and 138n will typically need to be mapped to block numbers for the appropriate physical disk where the desired data is actually stored. Thus, the block numbers issued by the file system drivers 138a and 138n may be referred to as virtual block numbers, although the file system drivers 138a and 138n believe them to be physical block numbers.

The virtualization software 119 receives disk commands on the disk interfaces 131a, 131n that are directed to the virtual interface cards. The virtualization software 119 then effectively maps the virtual block numbers issued by the file system drivers 138a and 138n to the correct locations for the actual physical storage 108. For an implementation in an unhosted virtual computer system, the virtualization software may interface directly with the physical storage 108. For example, the virtualization software 119 may contain its own file system driver.

However, the implementation of FIGS. 1 and 2 involves a hosted virtual computer system. In such an implementation, the virtualization software 119 interfaces with host operating system 116 and file system driver 120 to access the physical storage 108. Host operating system 116 and file system driver 120 may provide one or more APIs for use by applications running on the host operating system, including a file system API 117. Virtualization software 119 and storage resource manager 118 may gain access to this file system API 117 through various means, including loading an application on top of host operating system 116. In this case, a communication link may be established between the virtualization software 119 and the application loaded onto the host operating system. Virtualization software 119 may then direct the application to access the API as needed.

Host file system driver 120 may establish and maintain a host file system 121 on the storage 108, in a conventional manner. File system API 117 may provide standard functionality for creating and using files within the host file system 121, including functionalities such as creating a file, opening a file, reading from a file, writing to a file, and closing a file.

File system driver 120 uses a disk interface 107 to access the storage 108. The disk interface 107 may be a conventional disk interface, such as described above in connection with disk interfaces 131a, 131n. Thus, for example, file system driver 120 may read a block of data from a specified block number, or write a block of data to a specified block number. In this case, the specified block number may be referred to as a physical block number because it identifies a specific block on the actual physical storage 108. Host file system driver 120 uses the disk interface 107 to create and maintain host file system 121 on physical storage 108.

As described above, data written to a virtual disk by guest software within a virtual machine may actually be stored within one or more files in a file system in the actual physical storage. In this case, a file that contains the data for a virtual disk may be referred to as a "backing" file, as it "backs" the data written to the virtual disk. FIG. 2 shows a first virtual disk file 109a and a second virtual disk file 109n within the host file system 121. Virtual disk file 109a is created and maintained by host file system driver 120 to back virtual disk 130a. Similarly, virtual disk file 109n is created and maintained by host file system driver 120 to back virtual disk 130n. Thus, virtual disk file 109a contains the data that is written to virtual disk 130a, including guest file system 137a, while virtual disk file 109n contains the data that is written to virtual disk 130n, including guest file system 137n. The guest file systems 137a and 137n are shown with solid lines inside the storage 108 because this is where the guest file systems 137a and 137n, along with their associated files and data, are actually stored. In contrast, guest file systems 137a and 137n are shown with dashed lines inside their respective virtual disks 130a, 130n because the guest file systems, along with their associated files and data, only appear to be stored in the respective virtual disks 130a, 130n, from the perspective of the guest software executing in the respective virtual machines 124a, 124n.

Virtualization software 119 uses the API 117, as described above, to access virtual disk files 109a and 109n, through host file system driver 120. Thus, the virtualization software 119 actually maps virtual block numbers from the guest file system drivers 138a and 138n into appropriate offsets into the corresponding virtual disk files 109a, 109n. The file system driver 120 then maps the offsets into the virtual disk files 109a, 109n to the correct physical block numbers in a conventional manner, and issues appropriate commands to the physical storage 108.

Except as described below, all of the components illustrated in FIG. 2 may be substantially the same as corresponding components in an existing virtual computer system, such as a computer system loaded with the Workstation virtualization product from VMware, Inc., with a standard, supported operating system installed in the virtual machine, along with one or more compatible software applications.

Now suppose that the host system 100, illustrated in FIG. 1, has been loaded up with all desired software and data, including host operating system 116 and virtualization software 119, except that virtual machines 124a and 124n have not yet been created. Suppose further that the storage 108 has an available physical disk space capacity of 10 gigabytes, for the exclusive use of virtual machines 124a and 124n. Next, suppose that virtual machines 124a and 124n are created, and each virtual machine is given a designated virtual disk space capacity of 10 gigabytes, where the virtual disk space is to be backed by virtual disk files 109a, 109n, respectively. Suppose further that the virtual disks 130a, 130n are set up as sparse virtual disks. Under these circumstances, the physical storage 108 is overcommitted by 10 gigabytes. Next, suppose that guest software is loaded into each virtual machine 124a, 124n, including guest operating systems 134a, 134n and guest applications 142a, 142b, 142c, 142d. Suppose that the total disk space occupied by guest software and guest data in each virtual machine is 2 gigabytes, such that each of the virtual disk files 109a, 109n take up approximately 2 gigabytes of disk space. Thus, at this point, the available virtual disk space on each virtual disk 130a, 130n is 8 gigabytes, but there are only 6 gigabytes of available physical disk space remaining. Under this scenario, the guest software in the virtual machines may continue writing data to the virtual disks 130a, 130n until all of the physical disk space is utilized, possibly resulting in the disk hardware reporting a write error, as described above.

Now suppose that an embodiment of this invention is implemented in the virtual computer system illustrated in FIGS. 1 and 2. In particular, virtualization software 119 includes storage resource manager 118, and user-level regulation file managers 140a and 140n are executing in their respective virtual machines 124a, 124n. Regulation file manager 140a uses guest file system driver 138a to create and use a disk space regulation file 143a within guest file system 137a on virtual disk 130a. Regulation file 143a, of course, is actually stored within virtual disk file 109a within storage 108. Similarly, regulation file manager 140n uses guest file system driver 138n to create and use a disk space regulation file 143n within guest file system 137n on virtual disk 130n. Again, regulation file 143n is actually stored within virtual disk file 109n within storage 108. Again, the regulation files 143a, 143n are shown in dashed lines in the virtual disks 130a, 130n in FIG. 2 because the files only appear to guest software to be stored in the virtual disks 130a, 130n.

In some embodiments of this invention, disk space regulation files 143a, 143n do not contain any meaningful data. Instead, regulation file managers 140a and 140n increase or decrease the size of their respective regulation files 143a, 143n, so that the regulation files occupy more or less of the virtual disk space on the respective virtual disks, without writing meaningful data. If the respective guest file system driver 138a, 138n provides functionality to set the size of a file to a specified file size, then the regulation file manager 140a, 140n may set its regulation file 143a, 143n to a desired size, without writing any data. Otherwise, the regulation file manager will generally need to write or delete some data from the regulation file, even if the data is meaningless, such as by writing all zeros, for example. So, the regulation file managers 140a, 140n adjust the size of the regulation files 143a, 143n to adjust the amount of virtual disk space that is available for use by guest software in the respective virtual machine 124a, 124n, The available virtual disk space is equal to the "designated virtual disk space" minus the "utilized virtual disk space" minus the amount of disk space occupied by the respective regulation file 143a, 143n. If the size of the regulation file 143a is increased, then the available virtual disk space on the virtual disk 130a that is available for use by other guest software within virtual machine 124a decreases accordingly, and vice versa.

One possible use of the regulation file managers and regulation files is to prevent the type of disk write error situations, due to overcommitted physical disk space, described above.

Suppose that regulation file manager 140a sets the size of regulation file 143a to 5 gigabytes, and regulation file manager 140n sets the size of regulation file 143n to 5 gigabytes. Now, each of the virtual disks 130a, 130n has 5 gigabytes of effective virtual disk space, and there are only 3 gigabytes of available virtual disk space on each of the virtual disks 130a, 130n. Then, if the utilization of virtual disk space by the guest software in either of the virtual machines 124a, 124n increases by 3 gigabytes, the respective guest operating system 134a, 134n and/or the respective file system driver 138a, 138n will perceive that the respective virtual disk 130a, 130n is full, and will not permit the writing of any more data. This would ensure that the guest operating systems 134a, 134n and/or the guest file system drivers 138a, 138n keep their respective virtual disks 130a, 130n from increasing in size to the point that the physical disk space required to back the virtual disks 130a, 130n does not exceed the actual storage capacity of storage 108.

The regulation file managers 140a, 140n may determine appropriate sizes for their respective regulation files 143a, 143n by various means. For example, the regulation file managers 140a, 140n may receive information from a system administrator, specifying the desired sizes for the respective regulation files 143a, 143n.

In other embodiments of the invention, a communication link is established between the regulation file managers 140a, 140n and the storage resource manager 118, and the storage resource manager 118 may specify appropriate file sizes for the respective regulation files 143a, 143n. Existing literature, including prior patents and patent applications from VMware, Inc., describe various techniques that may be used to establish a communication link between the regulation file managers 140a, 140n and the storage resource manager 118. Messages that may be communicated over the communication link from storage resource manager 118 to regulation file managers 140a, 140n may include requests to create, inflate (or increase the size of), deflate (or decrease the size of), or delete a regulation file. Parameters associated with the requests may include requested regulation file size, inflation amount, or deflation amount. Commands communicated by regulation file managers 140a, 140n to storage resource manager 118 may include acknowledgments indicating whether a given request was successfully executed or not.

The storage resource manager 118 may use any of various different algorithms and various different types of information to select appropriate file sizes for the regulation files 143a, 143n. For example, the storage resource manager 118 may determine the amount of available physical disk space remaining and the amount of available virtual disk space for each of the virtual disks 130a, 130n. The storage resource manager 118 may also receive various other types of information, such as anticipated storage growth required for each virtual machine 124a, 124n and relative priorities for the two virtual machines 124a, 124n. This information may be received from various sources, such as from user input from an administrator of the virtual computer system, or from another software module that determines the information through any of various means, such as through predictive algorithms. The storage resource manager 118 may then dynamically adjust the available virtual disk space available to guest software in each virtual machine 124a, 124n using the respective regulation file managers 140a, 140n and the respective regulation files 143a, 143n.

During operation of the virtual computer system, the storage resource manager 118 may effectively reserve a portion of the virtual disk space that was designated for use by guest software in a particular virtual machine 124a, 124n, by increasing the size of the respective regulation file 143a, 143n, through the respective regulation file manager 140a, 140n. For example, regulation file 143a may be increased in size to reduce the amount of effective disk space available to guest software within virtual machine 124a. This assures that the guest software within virtual machine 124a cannot consume an amount of physical disk space corresponding to the virtual disk space utilized by regulation file 143a, effectively reserving that amount of physical disk space. The reserved portion of physical disk space may then be used for any suitable purpose. For example, the reserved portion may be made available for use by other virtual machines. One advantage of using regulation files to increase or decrease the amount of effective disk space available to a virtual machine is that this mechanism generally does not require rebooting of the host computing system or any software executing within the context of the virtual machine.

In one exemplary application of the subject matter described herein, a virtual machine may be initially designated a larger virtual disk or portion of physical disk storage 108 than it needs. After the initial designation, regulation file manager 140a may create regulation file 143a to reserve disk space from guest operating system 134a so that the space can be made available to other virtual machines. In one implementation, regulation file 143a may consist of reserved sectors of physical disk resources 108 without requiring that guest operating system 134a write any data to regulation file 143a. In an alternate implementation, regulation file 143a may include predetermined characters, such as all zeros or another code, that signal to storage resource manager 118 that the space has been reserved by guest operating system 134a and is available for allocation to other virtual machines.

Although in the illustrated example, regulation file managers 140a, 140n are implemented as user-level applications, the subject matter described herein is not limited to such an implementation. In an alternate implementation, regulation file managers 140a, 140n may be implemented as drivers loaded into the respective guest operating systems 134a, 134n, as described above. Any user-mode or kernel-mode executable capable of creating a file, communicating the file's existence and location to storage resource manager 118, and varying the size of the file in response to commands from storage resource manager 118 to increase or decrease the amount of disk space reserved is intended to be within the scope of the subject matter described herein.

Figure 3:
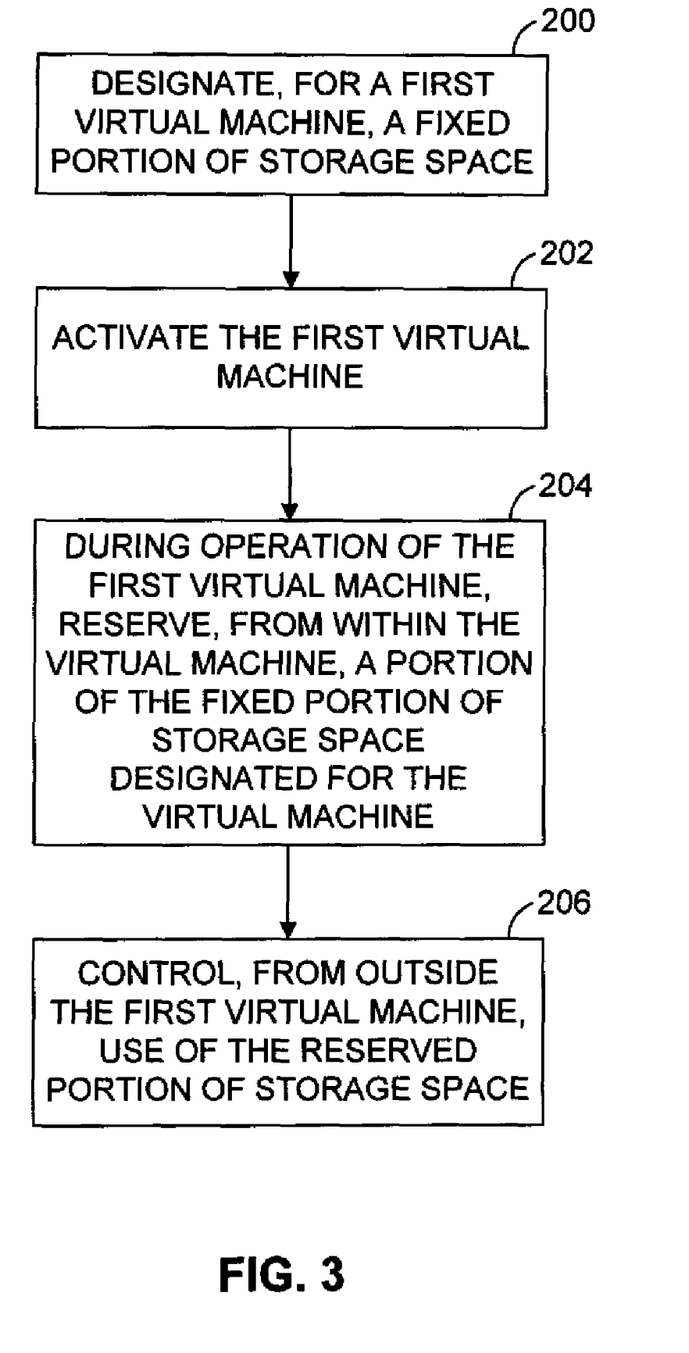
FIG. 3 is a flow chart illustrating a method according to one embodiment of this invention.

FIG. 3 is a flow chart illustrating an exemplary process for flexible run-time reservation of disk space, or other persistent storage space, from within a virtual machine in a computing system according to an embodiment of this invention. Referring to FIG. 3, in step 200, a fixed portion of disk space accessible by a computing system is designated for use by a first virtual machine. For example, in FIG. 1, virtual machine 124a may be designated a virtual disk size of 100 gigabytes, where, for example, the total disk storage of host system 100 may be one terabyte.

Returning to FIG. 3, in step 202, the first virtual machine is activated. For example, in FIG. 1, virtual machine 124a may be loaded into memory 106 of host system 100, and the virtual machine 124a may begin execution, using host processor 112.

Returning to FIG. 3, in step 204, during operation of the first virtual machine, a portion of the fixed portion of disk space designated for use by the first virtual machine is reserved. In FIG. 1, storage resource manager 118 may issue a request to regulation file manager 140a to create a regulation file 143a of a particular size corresponding to the amount of disk space desired to be reserved. Continuing with the example above, if the virtual disk designated for use by virtual machine 124a is initially 100 gigabytes and virtual machine 124a only needs 20 gigabytes for its initial disk image, the regulation file 143a may initially be sized at 50 gigabytes, which would allow virtual machine 124a 30 gigabytes of growth beyond its initial size and 50 gigabytes that can be reclaimed or allocated to other virtual machines at run time. Once regulation file 143a is created, regulation file manager 140a communicates an acknowledgement of the successful creation to storage resource manager 118.

Guest operating system 134a preferably ensures that no other entities within virtual machine 124a write to any of the space reserved for regulation file 143a. In addition, regulation file manager 140a preferably communicates to storage resource manager 118 the location of the physical storage that is reserved for regulation file 143a. In one implementation, regulation file manager 140a may communicate the locations of the sectors of physical storage 108 that are reserved for regulation file 143a to storage resource manager 118. In an alternate implementation, regulation file manager 140a may write all zeros to regulation file 143a, and storage resource manager 118 may recognize the storage sectors that are all zeros as available for allocation to other virtual machines. In yet another alternate implementation, regulation file manager 140a may write predetermined characters, or one or more patterns of characters, to regulation file 143a that indicate to storage resource manager 118 that the storage is reserved and available for allocation to other virtual machines.

Returning to FIG. 3, in step 206, use of the reserved portion is controlled from outside of the first virtual machine. In one example, the portion of disk space reserved to the first virtual machine may be made available for use by a second virtual machine. In FIG. 1, once storage resource manager 118 receives confirmation from regulation file manager 140a of creation of regulation file 143a, storage resource manager 118 may signal to another virtual machine, such as virtual machine 124n, that additional disk space is available by decreasing the size of the regulation file associated with the other virtual machine. For example, if two virtual machines each have 100 gigabyte disks and 50 gigabyte regulation files, storage resource manager 118 may instruct the second virtual machine to decrease its regulation file by 30 gigabytes to give it access to 30 of the 50 gigabytes reserved by the regulation file of the first virtual machine. The subject matter described herein is not limited to making the portion of disk space reserved from one virtual machine available for use by another virtual machine. For example, the reserved portion of disk space may be used by the virtualization software to limit or control the size of the first virtual machine without making the reserved portion available to other entities. In yet another example, the reserved portion of disk space may be made available to an application or an operating system outside of the first virtual machine. Any suitable use for the reserved portion of disk space is intended to be within the scope of this invention.

An additional application of the ability to dynamically reserve disk space from a virtual machine is in moving a sparse virtual disk from one host to another, even if the target disk is too small to hold the sparse virtual disk at its maximum size. For example, an existing virtual machine may be copied from a disk drive to a flash-memory-based portable storage device or thumb drive. Because these devices commonly have lower capacities or higher cost per capacity than hard drives, limiting space consumption is more important. For example, the sparsely stored virtual machine may occupy 4 gigabytes but may initially be allocated 10 gigabytes of storage. A 6-gigabyte regulation file could be created after the virtual machine is created on the source computing system to limit the size of the virtual machine to 4 gigabytes so that the virtual machine will fit on a 4-gigabyte target disk. Even though the regulation file reserves 6 gigabytes, only a small amount of data that indicates its existence and the reserved physical disk sectors are required to be transferred to the target disk.

An additional specific application of the ability to dynamically reserve disk space from a virtual machine is in creating all virtual disks at the largest size supported by the interface between the virtual machine and the host system, but then immediately bounding the size of their backing storage using regulation files. For example, if a virtual machine is allowed by its associated virtual machine monitor a maximum of 100 gigabytes of host disk space, the virtual machine may be allocated 100 gigabytes of host disk space. A regulation file of 60 gigabytes may then be created so that only 40 gigabytes of actual host disk space are required to be kept as backing storage for the virtual machine. More broadly, one or more virtual machines may be provided with designated virtual disk space that is arbitrarily large, and then a portion of the designated virtual disk space may be reserved for other uses, as described above. Here, "arbitrarily large" means that the designated virtual disk space is not related to any anticipated or predicted storage needs of the virtual machine. Instead, the effective virtual disk space remaining after the reservation of a portion of the designated virtual disk space may relate to an anticipated or predicted storage usage of the virtual machine.

Another potential application of the ability to dynamically reserve disk space from a virtual machine involves adapting to the movement or migration of a virtual machine from a first physical computer to a second physical computer. For example, suppose that a plurality of virtual machines are already executing on the second physical computer. Then suppose that another virtual machine is to be migrated from the first physical computer to the second physical computer. If the physical disk space utilized by the migrating virtual machine is not shared between the first physical computer and the second physical computer, then the migration may cause or exacerbate issues relating to overcommitment of the storage resources that are accessible from within the second physical computer. Based on various physical and virtual disk space data, such as the available physical disk space on the second computer, the utilized and/or effective virtual disk space for each of the virtual machines already executing on the second computer, and the utilized and/or effective and/or designated virtual disk space on the migrating virtual machine, the effective virtual disk space of the migrating virtual machine, and/or the effective virtual disk space of one or more of the virtual machines that are already executing on the second physical computer, may be dynamically adjusted to alleviate overcommitment issues, while attempting to provide each of the virtual machines with the necessary or desired effective virtual disk space. Such dynamic adjustment may be particularly useful in the case of a template virtual machine that may be instantiated on various different physical computers having access to different amounts of physical disk storage. The effective virtual disk space provided to the virtual machine may be adjusted based on the particular physical computer on which the virtual machine is to be executed.

Yet another potential application of the ability to dynamically reserve disk space from a virtual machine is in overcommitting disk space on a computing system and then releasing it back to virtual machines in a metered fashion, avoiding write errors. As described above, disk space on a computing system may be overcommitted when virtual disks are sparsely stored based on their initial disk image sizes, but the total initial designation of disk space to the virtual disks exceeds the total disk storage space of the host. When this occurs, regulation files may be used in each virtual machine to trigger operating-system-specific prompts to a user based on the effective disk space provided to a virtual machine to prevent the total disk space of the host from being exceeded. For example, on a Windows® machine, when the Windows® operating system detects that the designated disk space is almost 100% utilized, the Windows® operating system will prompt the user to delete some files to free up disk space. Without the regulation file, it is possible for a sparsely stored virtual machine that thinks it has more disk space than it actually has to issue a write operation that would cause the amount of host disk space to be exceeded. In this situation, the write operation would fail, and the virtual machine may crash, attempt to initiate misguided attempts at disk recovery or otherwise malfunction. When the host disk is overcommitted and a write occurs, the hardware returns a write error without indicating that the write error was caused by overcommitment. The guest operating system interprets the write error as being caused by a disk failure, since it believes the disk to have available space. The guest operating system could attempt recovery of the data being written and reattempt the write to another location, which would also fail. Thus, one option for dealing with a write error of unknown cause is to shut down the virtual machine that performed the write.

Using regulation files, this condition may be avoided because, even though the host disk is overcommitted, the regulation files cause warning mechanisms to be triggered when disk space utilization by a virtual machine approaches the effective virtual disk space provided to the virtual machine to prevent actual overutilization of the host disk from occurring. For example, each of 10 virtual machines with initial footprints of 2 gigabytes each may be designated to have 10 gigabytes of storage at creation time, where the backing for each virtual disk is sparsely stored on a 50-gigabyte host disk. A 6-gigabyte regulation file may be created within the context of each virtual machine. As a result of the 6 gigabyte regulation file, each virtual machine has an effective virtual disk space of 10−6=4 gigabytes. Accordingly, when disk utilization of a virtual machine approaches 4 gigabytes, operating-system-specific warnings will be triggered to prompt the user to delete some files. Because the trigger will be initiated at 4 gigabytes for each of the virtual machines, the likelihood of a virtual machine failing due to over-utilization of host system resources is reduced.

Yet another specific application of the ability to dynamically reserve disk space from a virtual machine is in adding storage to a virtual machine on demand without needing to add additional virtual hardware, partitions, or file systems. For example, in order to add disk space to a virtual machine, storage resource manager 118 may simply instruct that virtual machine to reduce the size of its regulation file. By reducing the size of the regulation file, the virtual machine will have additional available disk space for other uses. For example, a virtual machine may have an initial virtual disk size of 10 gigabytes with 4 of the 10 gigabytes reserved using a 4-gigabyte regulation file. Thus, the virtual machine will have an effective virtual disk space of 6 gigabytes. In order to dynamically increase the amount of effective disk space available to the virtual machine, the regulation file may be deflated by a predetermined amount, such as 2 gigabytes. If the regulation file is reduced in size to 2 gigabytes, the virtual machine will have 8 gigabytes of effective virtual disk space. The deflating of the regulation file can be performed at run-time without requiring that the virtual machine be rebooted. Also, if additional physical disk space is made available to the host system, the regulation file of one or more virtual machines executing on the host system may be deflated, as desired, to enable the virtual machine(s) to make use of the newly added physical disk space.

Once a portion of disk space is reserved from a virtual machine, its size can be controlled from outside of the virtual machine. Returning to FIG. 1, storage resource manager 118 may reside outside of virtual machines 124a-124n and may control the sizes of their respective regulation files. By controlling the sizes of their respective regulation files, storage resource manager 118 controls the size of reserved disk space of each virtual machine that is available for use by other virtual machines.

Figure 4:
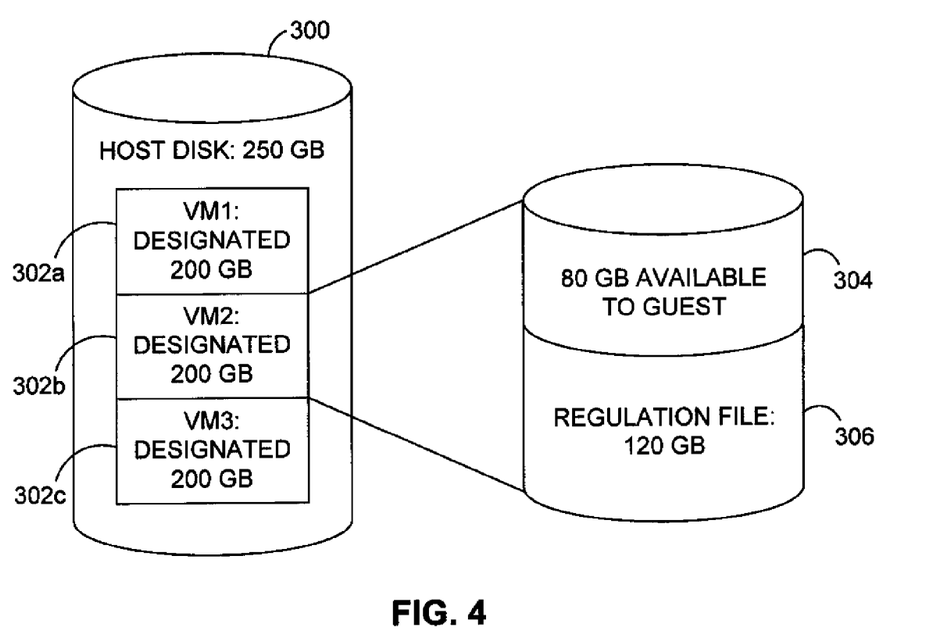
FIG. 4 is a diagram illustrating a possible usage of a physical disk according to one embodiment of this invention.

FIG. 4 is a block diagram illustrating an exemplary application of regulation files according to an embodiment of this invention. In FIG. 4 a host disk 300 includes 250 gigabytes of storage. Three virtual machines 302a, 302b, and 302c are stored on the host disk. Each virtual machine is initially designated to have 200 gigabytes of storage. As a result, the host disk is overcommitted. However, in order to ensure that write errors do not occur, each virtual machine may be given 80 gigabytes of effective storage, as represented by effective virtual disk portion 304 and a 120 gigabyte regulation file 306. When a guest operating system associated with one of the virtual machines detects that its disk utilization is approaching its effective virtual disk space, which in this example is 80 gigabytes, guest-operating-system-specific warnings may be triggered. If the guest operating system associated with each virtual machine 302a, 302b, and 302c triggers warnings to its user when the disk utilization of each virtual machine approaches 80 gigabytes, even though host disk 300 is overcommitted, write errors due to overcommitment will likely be avoided. Relative sizes of the regulation files can be adjusted as the storage needs of each virtual machine changes.

It will be understood that various details of the presently disclosed subject matter may be changed without departing from the scope of this invention. Furthermore, the foregoing description is for the purpose of illustration only, and not for the purpose of limitation.

What is claimed is:

1. A method for flexible run-time reservation of storage space in a computing system, the method comprising:
   designating, for use by a first virtual machine, a fixed portion of persistent storage space accessible by the computing system;
   activating the first virtual machine;
   during operation of the first virtual machine, reserving, from within the first virtual machine, a portion of the fixed portion of the persistent storage space designated for use by the first virtual machine by creating a regulation file in a guest file system of a virtual disk, wherein the virtual disk is stored as a file in the persistent storage space; and
   controlling, from outside of the first virtual machine, use of the reserved portion of the persistent storage space.

2. The method of claim 1 wherein the reserving, from within the first virtual machine, a portion of the persistent storage space designated for use by the first virtual machine includes providing an executable within the first virtual machine that reserves the portion of the persistent storage space designated for use by the first virtual machine.

3. The method of claim 2 wherein the executable comprises a kernel mode executable.

4. The method of claim 3 wherein the kernel mode executable comprises a driver.

5. The method of claim 2 wherein the executable comprises a user mode executable.

6. The method of claim 2 wherein reserving, from within the first virtual machine, a portion of the persistent storage space designated for use by the first virtual machine includes using the executable to create the regulation file in the guest file system of the first virtual machine, the regulation file corresponding in size to the amount of persistent storage space to be reserved.

7. The method of claim 6 wherein the executable determines a size for the regulation file based on a request received from outside of the first virtual machine.

8. The method of claim 7 wherein the request received from outside of the first virtual machine is received from a storage resource manager located outside of the first virtual machine, wherein the storage resource manager dynamically adjusts an amount of available virtual disk space for each of a plurality of virtual machines operating in the computing system.

9. The method of claim 8 wherein reserving a portion of the persistent storage space designated for use by the first virtual machine includes communicating, from the first virtual machine to the storage resource manager, locations where the regulation file is stored in physical storage of the computing system.

10. The method of claim 8 wherein reserving a portion of the persistent storage space designated for use by the first virtual machine includes storing at least one character in the regulation file that the storage resource manager will recognize as reserved space.

11. The method of claim 8 comprising, monitoring, using the storage resource manager, storage usage by each of the virtual machines executing on the computing system and dynamically adjusting available virtual disk space among the virtual machines on an as needed basis by changing regulation file sizes in file systems of the virtual machines.

12. The method of claim 1 wherein controlling use of the reserved portion of persistent storage space includes making the reserved portion of persistent storage space available for use outside of the first virtual machine.

13. The method of claim 12 wherein making the reserved portion of persistent storage space available for use outside of the first virtual machine includes making the reserved portion of persistent storage space available to a second virtual machine.

14. The method of claim 13 wherein making the reserved portion of persistent storage space available to the second virtual machine comprises decreasing, from within the second virtual machine, an amount of persistent storage occupied by a second regulation file stored in a guest file system used by the second virtual machine.

15. The method of claim 12 wherein controlling use of the reserved portion of persistent storage space includes making the reserved portion available to one of an application, an operating system, and a virtualization software outside of the first virtual machine.

16. The method of claim 1 wherein controlling use of the reserved portion of persistent storage space includes using the reserved portion to limit growth of the first virtual machine.

17. The method of claim 1 comprising activating a plurality of virtual machines on the computing system, each of which is allocated a fixed portion of the persistent storage space and reserving a portion of the fixed portion of the persistent storage space allocated to the virtual machines using regulation files for dynamic adjustment so that each of the virtual machines has visibility of an effective virtual storage space that is less than the total fixed portion of the persistent storage space designated for use by each virtual machine and so that the effective virtual storage space is adjustable at run time by varying the regulation file sizes.

18. The method of claim 17 comprising sparsely storing data of the virtual machines on the persistent storage space of the computing system and using the regulation file of each respective virtual machine to trigger guest operating system mechanisms for warning a user when the amount of persistent storage space utilized by the virtual machine is approaching its effective virtual disk storage space.

19. The method of claim 1 comprising, controlling, from outside of the first virtual machine, the size of the reserved portion of persistent storage space.

20. A system for flexible run-time reservation of persistent storage space from a virtual machine in a computing system, the system comprising:
   one or more computer processors; and
   a computer-readable storage medium comprising:
      a regulation file manager for, during operation of a first virtual machine, reserving, from within the first virtual machine, a portion of the persistent storage space designated for use by the first virtual machine by creating a regulation file in a guest file system of a virtual disk, wherein the virtual disk is stored as a file in the persistent storage space; and
      a storage resource manager for controlling use of the reserved portion from outside of the first virtual machine.

21. The system of claim 20 wherein the regulation file manager comprises an executable located within the first virtual machine.

22. The system of claim 21 wherein the regulation file manager comprises a kernel mode executable.

23. The system of claim 22 wherein the regulation file manager comprises a driver.

24. The system of claim 21 wherein the regulation file manager comprises a user mode executable.

25. The system of claim 20 wherein the regulation file manager is adapted to create the regulation file in the guest file system of the first virtual machine, where the regulation file corresponds in size to the amount of persistent storage space desired to be reserved.

26. The system of claim 25 wherein the storage resource manager is adapted to request the regulation file of a specific size corresponding to an amount of persistent storage space desired to be reserved.

27. The system of claim 25 wherein the regulation file manager is adapted to communicate to the storage resource manager physical storage locations where the regulation file is stored.

28. The system of claim 25 wherein the regulation file manager is adapted to write at least one character in the regulation file that the storage resource manager will recognize as reserved space usable for dynamic adjusting an amount of available virtual disk storage space available to other virtual machines.

29. The system of claim 21 wherein the storage resource manager is adapted to monitor storage usage by each of a plurality of virtual machines executing on the computing system and to dynamically adjust an amount of available persistent storage space for each of the virtual machines by changing regulation file sizes in guest file systems of the virtual machines.

30. The system of claim 29 wherein data of the virtual machines are sparsely stored on the persistent storage space of the computing system and the regulation files are used to trigger guest operating system mechanisms for warning a user when the persistent storage space utilized by a virtual machine is approaching an effective virtual disk space for the virtual machine.

31. The system of claim 20 wherein the storage resource manager is adapted to instruct a second virtual machine to decrease the size of its regulation file to signal to the second virtual machine that at least a portion of the persistent storage space reserved by the first virtual machine is available for its use.

32. The system of claim 20 wherein the storage resource manager is adapted to use the reserved portion of persistent storage space to control the virtual storage space utilized by the first virtual machine.

33. The system of claim 20 wherein the storage resource manager is adapted to make the reserved portion of persistent storage space available to at least one of: a second virtual machine, an application, an operating system, and a virtualization software outside of the first virtual machine.

34. The system of claim 20 wherein the storage resource manager is adapted to control the size of the reserved portion of persistent storage space from outside of the first virtual machine.

35. A computer program product comprising computer executable instructions embodied in a non-transitory computer readable storage medium for performing steps comprising:
   designating, for use by a first virtual machine, a fixed portion of persistent storage space accessible by a computing system;
   activating the first virtual machine;
   during operation of the first virtual machine, reserving, from within the first virtual machine, a portion of the fixed portion of the persistent storage space designated for use by the first virtual machine by creating a regulation file in a guest file system of a virtual disk, wherein the virtual disk is stored as a file in the persistent storage space; and
   controlling, from outside of the first virtual machine, use of the reserved portion of the persistent storage space.

* * * * *